United States Patent [19]

Kunimoto

[11] Patent Number: 5,218,989
[45] Date of Patent: Jun. 15, 1993

[54] FLOW CONTROL VALVE

[75] Inventor: Sigeji Kunimoto, Kanagawa, Japan

[73] Assignee: Atsugi Unisia Corporation, Atsugi, Japan

[21] Appl. No.: 906,700

[22] Filed: Jun. 30, 1992

[30] Foreign Application Priority Data

Jul. 3, 1991 [JP] Japan .......................... 3-059277[U]

[51] Int. Cl.⁵ ............................................ G05D 11/03
[52] U.S. Cl. .................................................... 137/117
[58] Field of Search ................... 137/117; 251/324, 205

[56] References Cited

U.S. PATENT DOCUMENTS

| | | | |
|---|---|---|---|
| 2,843,141 | 7/1958 | Arnot | 137/117 |
| 3,618,628 | 11/1971 | Kramer | 137/117 X |
| 3,882,883 | 5/1975 | Droegemueller | 251/324 X |
| 4,388,941 | 6/1983 | Riedhammer | 137/117 X |
| 4,495,962 | 1/1985 | Hattori | 137/117 |
| 4,546,786 | 10/1985 | Koike | 137/117 |

Primary Examiner—Robert G. Nilson
Attorney, Agent, or Firm—Bachman & LaPointe

[57] ABSTRACT

A flow control valve unit for controlling flow rate of a pressurized working fluid flowing from a hydraulic pump to an actuator of a power steering device includes a spool chamber, a spool valve, an inlet port, a discharge port, a drain port and a notch. The spool chamber has a first chamber portion for receiving the fluid through the inlet port, and a second chamber portion which is communicated with the discharge port. The spool valve is movable from a first position in which the drain port is fully closed to a second position in which the drain port is partially opened. The second position defines first and second gaps respectively between a first land portion of the spool valve and an edge of the drain port and between the first land portion and an edge of the notch for allowing the fluid to flow from the first chamber portion to the drain port through two passages. The notch is positioned so as to be substantially opposed to the drain port and to make an area of the second gap larger than that of the first gap by a certain degree, such that, when the first gap is substantially narrowly opened, flow rate of the fluid flowing from the first chamber portion to said drain port through the first gap is set substantially equal to or less than flow rate of the fluid flowing through the second gap.

6 Claims, 2 Drawing Sheets

FLOW CONTROL VALVE

BACKGROUND OF THE INVENTION

1. Field of the Invention

The present invention relates in general to a flow control valve, and more particularly to a flow control valve for controlling flow rate of a pressurized working fluid fed to an actuator of a power steering device of a motor vehicle.

2. Description of the Prior Art

A power steering device is widely used in a motor vehicle for assisting the driver to smoothly operate the steering wheel. The power steering device is usually equipped with a pump for producing a pressurized working fluid for operating the same. The pump is usually driven by the engine of the vehicle so that flow rate of the pressurized working fluid discharged from the pump varies in proportion to rotational speed of the engine. Accordingly, such a pump is required to supply a sufficient flow Accordingly, such a pump is required to supply a sufficient flow rate of the pressurized working fluid even when the engine speed is low so as to fully assist a driver to smoothly operate the steering wheel. However, when the engine speed is high, flow rate of the pressurized working fluid fed to an actuator of the power steering device must be lowered so as to stiffen the steering response for ensuring the driving safety in a high speed range of the car. Thus, various types of flow control valve have been proposed to control flow rate of the pressurized working fluid.

Referring to FIG. 2, a conventional flow control valve unit will be described in the following.

The flow control valve unit 10 is formed in a housing 12 of a hydraulic pump (not shown). The flow control valve unit 10 comprises a generally cylindrical spool chamber 14 and a spool valve 16 which is axially slidably disposed therein. The spool chamber 14 has a closed end 18, and is communicated through an orifice 20 with a discharge port 22 which is communicated with an actuator (not shown) of a power steering device (not shown). The spool chamber 14 is further communicated with a drain or recirculating port 24 and an inlet port 26, which are disposed on the opposite sides of an outer cylindrical surface of the spool chamber 14, as illustrated. Both the drain port 24 and the inlet port 26 are arranged perpendicular to a longitudinal axis of the spool chamber 14. It should be noted that the inlet port 26 is positioned closer to the orifice 20 than the drain port 24 is, with respect to a direction along the longitudinal axis of the spool chamber 14. The drain port 24 serves to recirculate excessive working fluid to the hydraulic pump so as to control flow rate of the pressurized working fluid flowing to the discharge port 22. The inlet port 26 serves to feed the pressurized working fluid from the hydraulic pump into the spool chamber 14.

The spool valve 16 has first and second land portions 16a 16b and a spool portion 16c which is interposed therebetween. The spool chamber 14 is divided into a first chamber portion 14a which is defined between the orifice 20 and the spool valve 16, and a second chamber portion 14b which is defined between the spool valve 16 and the closed end 18 of the spool chamber 14. A return spring 28 is disposed in the second chamber portion 14b so as to urge the spool valve 16 toward the orifice 20. The discharge port 22 is communicated with the second chamber portion 14b through a communication passage 30.

For the purpose which will be clarified hereinafter, there is provided a notch 32 which is opposed to and aligned with the drain port 24, as illustrated. To construct the drain port 24 and the notch 32, for example, the housing 12 is drilled through and perpendicularly to the spool chamber 14. However, if desired, other methods may be taken to construct the drain port 24 and the notch 32.

Operation of the spool valve unit 10 will be described in the following.

While the pump speed is maintained within a predetermined low range due to a low engine speed, fluid discharge rate of the pump is set to be low. This makes the pressure differential between the first and second chamber portions 14a and 14b small relative to the biasing force of the return spring 28. Therefore, the spool valve 16 takes a first position in which the first land portion 16a is positioned closer to the orifice 20 than the notch 32 and the drain port 24 are, with respect to a direction along the longitudinal axis of the spool chamber 14. That is, the drain port 24 is fully closed by the first land portion 16a so as to prevent the flow of working fluid into the drain port 24. Accordingly, all the working fluid supplied to the first chamber portion 14a is fed to the actuator of the power steering device through the orifice 20 and the discharge port 22. Thus, during a practical low engine speed range, the driver is fully assisted to smoothly operate the steering wheel.

When the pump speed exceeds the predetermined low range, fluid discharge rate of the pump also increases. This makes the pressure differential between the first and second chamber portions 14a and 14b large so as to overcome biasing force of the return spring 28. Therefore, the spool valve 16 is moved toward the closed end 18 of the spool chamber 14. Thus, as is seen from FIG. 2, the spool valve 16 takes a second position in which the drain port 24 is partially opened. Under this condition, as is shown by two arrows of FIG. 2, a part of the pressurized working fluid supplied from the pump flows from the first chamber portion 14a into the drain port 24 through first and second gaps 34 and 36. The first gap 34 is defined between an edge of the drain port 24 and the first land portion 16a of the spool valve 16. The second gap 36 is defined between the first land portion 16 and an edge of the notch 32. The first and second gaps 34 and 36 have the same area defined in a direction along the longitudinal axis of the spool chamber 14, because the first land portion 16a is arranged perpendicular to the cylindrical surface of the spool chamber 14. Due to the flow of working fluid from the first chamber portion 14a into the drain port 24, flow rate of the working fluid into the discharge port 22 decreases so as to stiffen the steering response.

The above-mentioned notch 32 is provided to reduce a side force and a so-called flow noise, which are caused by the flow of working fluid through the narrowly opened first gap 34. In other words, if the notch 32 were not provided, the side force and the flow noise would become relatively large, particularly when the first gap 34 is relatively narrow. Thus, it should be noted that the notch 32 is provided to induce the flow of working fluid through the second gap 36 into the drain port 24, thereby reducing the flow rate of working fluid flowing through the first gap 34 and reducing the side force and the flow noise caused thereby. The side force is exerted on the spool valve 16 in a direction substantially perpendicular to the longitudinal axis of the spool chamber 14, which direction is an upward direction in FIG. 2. Therefore, the side force causes uneven abrasion of the spool valve 16 and the spool chamber 14. The flow noise occurs due to, for example, agitation and cavitation of the working fluid in the drain port 24.

However, the effect of the provision of the notch 32 is still unsatisfactory to reduce the side force and the flow noise which are caused by the flow of working fluid through the narrowly opened first gap 34.

SUMMARY OF THE INVENTION

It is therefore an object of the present invention to provide a spool valve unit which can prevent or at least minimize a flow noise and an uneven abrasion of a spool valve and a spool chamber of the spool valve unit.

According to the present invention, there is provided a flow control valve unit for controlling flow rate of a pressurized working fluid flowing from a hydraulic pump to an actuator, said unit including: means for defining a spool chamber in a housing of the pump, said spool chamber being communicated with an inlet port, a discharge port, and a drain port of the unit, the inlet port being communicated with the pump for feeding the fluid from the pump into said spool chamber, the discharge port being communicated at one end thereof with said spool chamber through an orifice and at the other end with the actuator for feeding the fluid to the actuator, the drain port being communicated with the pump for recirculating an excess of the fluid to the pump, the inlet port being disposed between the orifice and the drain port with respect to a direction along a longitudinal axis of said spool chamber; means for defining a notch, said notch being formed on said spool chamber so as to be substantially opposed to the drain port; and a spool valve which is axially slidably disposed in said spool chamber, said spool valve defining in said spool chamber a first chamber portion between the orifice and said spool valve and a second chamber portion between a closed end of said spool chamber and said spool valve, the second chamber portion being communicated with the discharge port, said spool valve being movable from a first position in which the drain port is fully closed relative to the first chamber portion to a second position in which the drain port is partially opened, the second position of said spool valve defining first and second gaps for allowing the fluid to flow from the first chamber portion to the drain port through two passages, the first gap being defined between a first land portion of said spool valve and an edge of said drain port, the second gap being defined between the first land portion of said spool valve and an edge of said notch, said notch being positioned so as to make an area of the second gap larger than that of the first gap, such that, when the first gap is substantially narrowly opened, flow rate of the fluid flowing from the first chamber portion to said drain port through the first gap is substantially equal to or less than flow rate of the fluid flowing through the second gap.

DESCRIPTION OF THE PREFERRED INVENTION

For ease of description, parts, constructions and operation substantially identical to those of the aforementioned conventional spool valve unit will be denoted by the same numerals, and detailed explanation of them will be omitted from the following.

Figure 1:
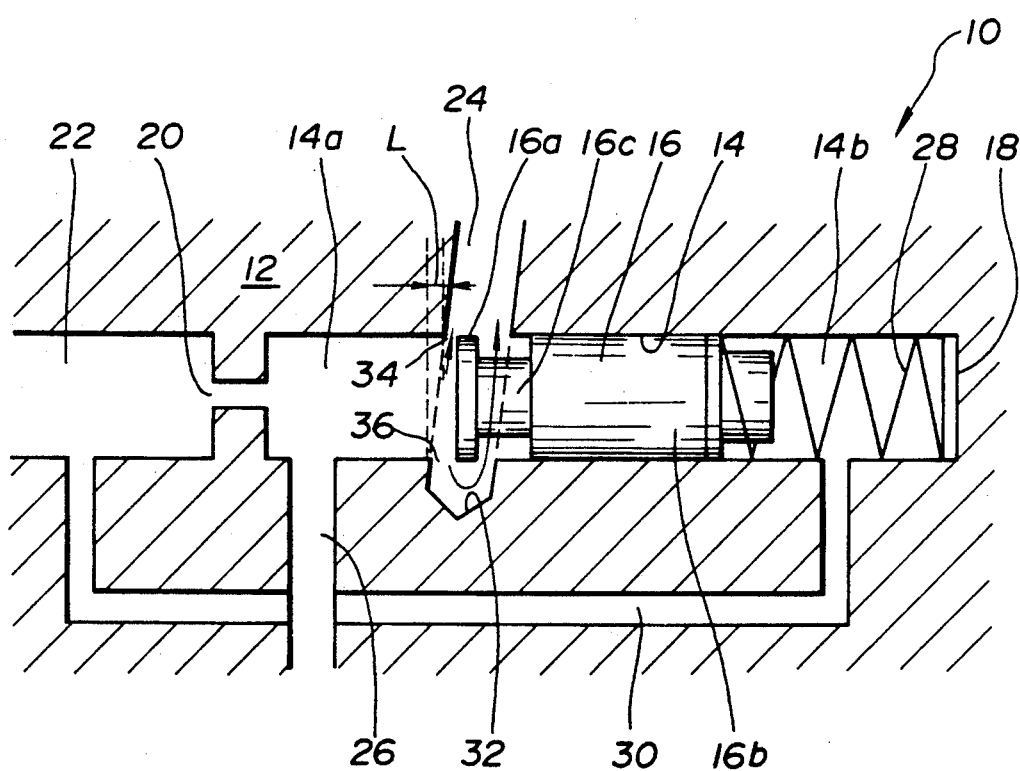
FIG. 1 is a cross sectional view showing an embodiment of a spool valve unit constructed in accordance with the present invention.
Figure 2:
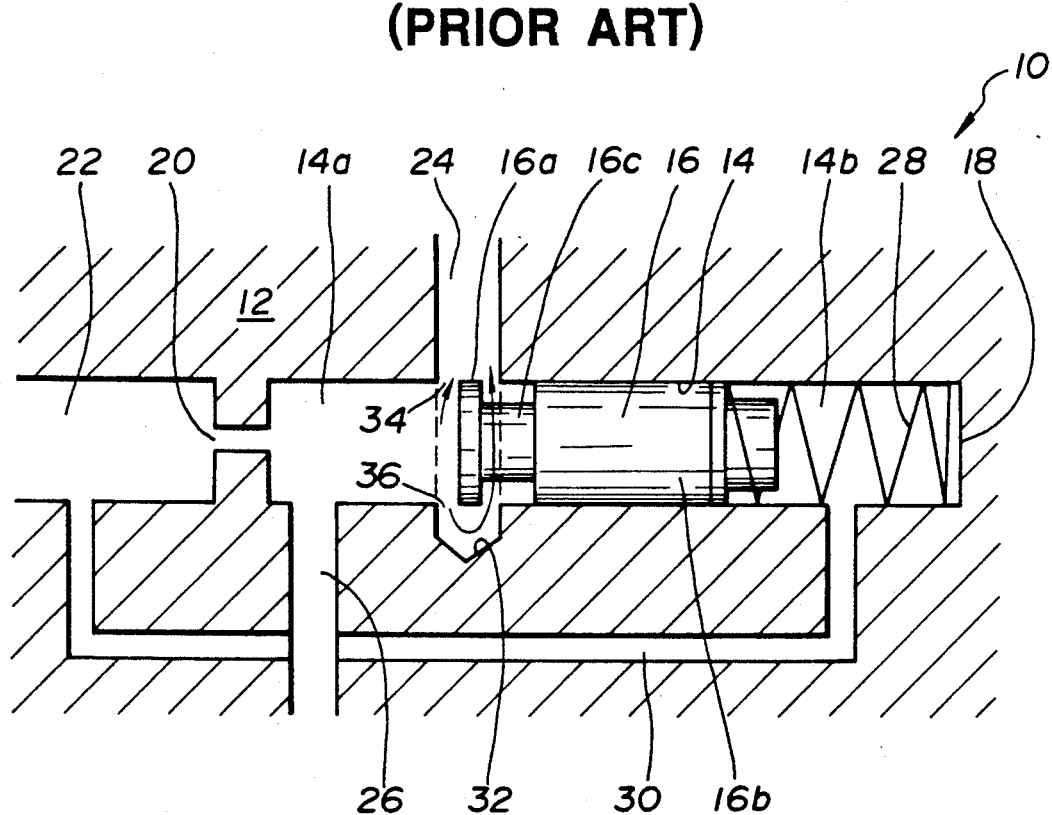
FIG. 2 is a view similar to FIG. 1, but showing a conventional spool valve unit.

Referring to FIG. 1, there is provided a spool valve unit 10 according to the present invention.

Unlike the conventional spool valve unit, a common longitudinal axis of the drain port 24 and the notch 32 is inclined toward the closed end 18 of the spool chamber 14, so that the notch 32 are displaced toward the orifice 20 by the distance of "L" in a direction along a longitudinal axis of the spool chamber 14, as illustrated. That is, length of the second gap 36 which is defined along the longitudinal axis of the spool chamber 14 is made longer by the distance "L" than that of the first gap 34. However, if desired, the drain port 24 and the notch 32 may not have the common longitudinal axis as long as the length of the second gap 36 is made longer than that of the first gap 34. That is, if desired, the notch 32 may not be aligned with the drain port 24.

Operation of the spool valve unit of the present invention will be described in the following.

While the pump speed is maintained within a predetermined low range due to a low engine speed, fluid discharge rate of the pump is set to be low. This makes the pressure differential between the first and second chamber portions 14a and 14b small relative to the biasing force of the return spring 28. Therefore, the spool valve 16 takes a first position in which the first land portion 16a is positioned closer to the orifice 20 than the notch 32 and the drain port 24 are, with respect to a direction along the longitudinal axis of the spool chamber 14. In other words, the drain port 24 is fully closed relative to the first chamber portion 14a. Accordingly, all the working fluid supplied through the first chamber portion 14a is fed to the actuator of the power steering device through the orifice 20 and the discharge port 22. Thus, during a practical low engine speed range, a vehicle driver is fully assisted to operate the steering wheel smoothly.

When the pump speed exceeds the predetermined low range by a certain degree, fluid discharge rate of the pump also increases. This makes the pressure differential between the first and second chamber portions 14a and 14b large so as to overcome the biasing force of the return spring 28. Therefore, the spool valve 16 is moved, toward the closed end 18 of the spool chamber 14, to a second position in which only the second gap 36 is opened to allow the pressurized working fluid to flow through the notch 32 to the drain port 24 and in which the first gap 34 is closed.

When the pump speed continues to increase, as is seen from FIG. 1, the spool valve 16 is moved to a third position in which the first gap 34 is only narrowly opened and the second gap 36 is more opened, by the distance "L", than the first gap 34 is, so as to allow the pressurized working fluid to flow from the first chamber portion 14a through the first and second gaps 34 and 36 into the drain port 24. It should be noted that, under this condition, flow rate of the fluid flowing from the first chamber portion 14a to the drain port 24 through the first gap 34 is substantially reduced by adjusting the value of the distance "L", so as to minimize the side force and the flow noise which are caused by the flow through the narrowly opened first gap 34.

Under a condition in which the spool valve 16 takes the third position, a first flow rate ($Q_1$) of the flow through the first gap 34 is expressed by the following equation (1):

$$Q_1 = C_1 \times A_1 \times (2 \times \Delta P/\rho)^{\frac{1}{2}} \qquad (1)$$

wherein, "$A_1$" represents the area of the first gap 34; "$C_1$" represents flow coefficient of the first gap 34; "$\rho$" represents density of the working fluid, and "$\Delta P$" represents pressure differential between the first chamber portion 14a and the drain port 24.

Under a condition in which the spool valve 16 takes the third position, a second flow rate ($Q_2$) of the flow through the second gap 36 into the drain port 24 is expressed by the following equation (2):

$$Q_2 = C_2 \times A_2 \times (2 \times \Delta P/\rho)^{\frac{1}{2}} \qquad (2)$$

wherein, "$A_2$" represents the area of the second gap 36; and "$C_2$" represents flow coefficient of a passage from the second gap 36 to the drain port 24 through the notch 32.

It is understood that the flow coefficient "$C_2$" is smaller than the flow coefficient "$C_1$" due to two different passages of the working fluid in length and configuration. However, if the distance "L" is adjusted to a certain desired value, the two flow rates "$Q_1$" and "$Q_2$" can be set approximately the same when the spool valve 16 takes the third position. This minimizes the side force and the flow noise which are caused by the flow through the narrowly opened first gap 34. Therefore, according to the present invention, uneven abrasion of the spool valve 16 and the spool chamber 14b can be minimized.

It is understood that the flow coefficient "$C_1$" is lowered by inclining the longitudinal axis of the drain port 24 toward the closed end 18 of the spool chamber 14. This is effective to make the two flow rates "$Q_1$" and "$Q_2$" approximately the same.

Furthermore, the first flow rate "$Q_1$" can be set less than the second flow rate "$Q_2$" by adjusting the distance "L". This is also effective to reduce the side force and the flow noise which are caused by the flow through the narrowly opened first gap 34.

Under a condition in which the spool valve takes the above-mentioned second position, the pressurized working fluid flows through only the second gap 36. However, under this condition, the flow rate is relatively low because the first land portion 16a is positioned relatively close to the orifice 20. That is, discharge rate of the pump is still relatively low. Furthermore, the position of the second gap 36 relative to the inlet port 26 is different from that of the first gap 34. Therefore, the flow through the narrowly opened second gap 36 does not markedly produce the side force and the flow noise.

As the pump speed continues to increase so as to move the spool valve 16 from the third position toward the closed end of the spool chamber, the area of the first gap 34 increases, such that the side force and the flow noise are not markedly produced.

In the present invention, it is optional to take other measures to reduce the flow rate of the fluid flowing through the narrowly opened first gap 34, besides that the area of the second gap 36 is made larger than that of the first gap 34.

What is claimed is:

1. A flow control valve unit for controlling flow rate of a pressurized working fluid flowing from a hydraulic pump to an actuator, said unit comprising:

means for defining a spool chamber in a housing of the pump, said spool chamber being communicated with an inlet port, a discharge port, and a drain port of the unit, the inlet port being communicated with the pump for feeding the fluid from the pump into said spool chamber, the discharge port being communicated at one end thereof with said spool chamber through an orifice and at the other end with the actuator for feeding the fluid to the actuator, the drain port being communicated with the pump for recirculating an excess of the fluid to the pump, the inlet port being disposed between the orifice and the drain port with respect to a direction along a longitudinal axis of said spool chamber;

means for defining a notch, said notch having a first width being formed on said spool chamber so as to be substantially opposed to the drain port having a second width; and a spool valve which is axially slidably disposed in said spool chamber along a longitudinal axis, said spool valve defining in said spool chamber a first chamber portion between the orifice and said spool valve and a second chamber portion between a closed end of said spool chamber and said spool valve, the second chamber portion being communicated with the discharge port, said spool valve being movable from a first position in which the drain port is fully closed relative to the first chamber portion to a second position in which the drain port is partially opened, the second position of said spool valve defining first and second gaps for allowing the fluid to flow from the first chamber portion to the drain port through two passages, the first gap being defined between a first land portion of said spool valve and an edge of said drain port, the second gap being defined between the first land portion of said spool valve and an edge of said notch, said first land portion having a third width taken with respect to the longitudinal axis wherein the third width is less than the second width and the third width is less than the first width, said notch being positioned with respect to said drain port along the longitudinal axis so as to make an area of the second gap larger than that of the first gap by a certain degree, such that, when the first gap is substantially narrowly opened, flow rate of the fluid flowing from the first chamber portion to said drain port through the first gap is substantially equal to or less than flow rate of the fluid flowing through the second gap.

2. A flow control valve unit according to claim 1, wherein the drain port and said notch have a common longitudinal axis thereof, and wherein the common longitudinal axis is inclined relative to the longitudinal axis of said spool chamber so that the area of the second gap is larger than that of the first gap.

3. A flow control valve unit according to claim 1, wherein the first chamber portion is defined between the first land portion of said spool valve and the orifice, and wherein the first land portion is arranged substantially perpendicular to the longitudinal axis of said spool chamber.

4. A flow control valve unit according to claim 3, wherein said spool valve has a second land portion and a spool portion which is interposed between the first and second land portions.

5. A flow control valve unit for controlling flow rate of a pressurized working fluid flowing from a hydraulic pump to an actuator, said unit comprising:

- a housing having a spool chamber formed therein, said spool chamber being communicated with an inlet port, a discharge port, and a drain port of the unit, the drain port having a first width, the inlet port being communicated with the pump for feeding the fluid from the pump into said spool chamber, the discharge port being communicated at one end thereof with said spool chamber through an orifice and at the other end with the actuator for feeding the fluid to the actuator, the drain port being communicated with the pump for recirculating an excess of the fluid to the pump, the inlet port being disposed between the orifice and the drain port with respect to a direction along a longitudinal axis of said spool chamber;
- means for defining a notch having a second width, said notch being formed on said spool chamber;
- a spool valve which is axially slidably disposed in said spool chamber, said spool valve defining in said spool chamber a first chamber portion between the orifice and said spool valve and a second chamber portion between a closed end of said spool chamber and said spool valve, the second chamber portion being communicated with the discharge port, said spool valve being movable from a first position in which the drain port is fully closed relative to the first chamber portion to a second position in which the drain port is partially opened, the second position of said spool valve defining first and second gaps for allowing the fluid to flow from the first chamber portion to the drain port through two passages, the first gap being defined between a first land portion of said spool valve and an edge of said drain port, the second gap being defined between the first land portion of said spool valve and an edge of said notch, said first land portion having a third width taken with respect to the longitudinal axis wherein the third width is less than the second width and the third width is less than the first width; and
- means for setting flow rate of the fluid flowing from the first chamber to the drain port through the first gap substantially equal to or less than flow rate of the fluid flowing through the second gap.

6. A flow control valve unit for controlling flow rate of a pressurized working fluid flowing from a hydraulic pump to an actuator, said unit comprising:

- means for defining a spool chamber in a housing of the pump, said spool chamber being communicated with an inlet port, a discharge port, and a drain port of the unit, the inlet port being communicated with the pump for feeding the fluid from the pump into said spool chamber, the discharge port being communicated at one end thereof with said spool chamber through an orifice and at the other end with the actuator for feeding the fluid to the actuator, the drain port being communicated with the pump for recirculating an excess of the fluid to the pump, the inlet port being disposed between the orifice and the drain port with respect to a direction along a longitudinal axis of said spool chamber;
- means for defining a notch, said notch being formed on said spool chamber so as to be substantially opposed to the drain port; and
- a spool valve which is axially slidably disposed in said spool chamber, said spool valve defining in said spool chamber a first chamber portion between the orifice and said spool valve and a second chamber portion between a closed end of said spool chamber and said spool valve, the second chamber portion being communicated with the discharge port, said spool valve being movable from a first position in which the drain port is fully closed relative to the first chamber portion to a second position in which the drain port is partially opened, the second position of said spool valve defining first and second gaps for allowing the fluid to flow from the first chamber portion to the drain port through two passages, the first gap being defined between a first land portion of said spool valve and an edge of said drain port, the second gap being defined between the first land portion of said valve and an edge of said notch, said notch being positioned so as to make an area of the second gap larger than that of the first gap by a certain degree, such that, when the first gap is substantially narrowly opened, flow rate of the fluid flowing from the first chamber portion to said drain port through the first gap is substantially equal to or less than flow rate of the fluid flowing through the second gap wherein the drain port and said notch have a common longitudinal axis thereof, and wherein the common longitudinal axis is inclined relative to a longitudinal axis of said spool chamber so that the area of the second gap is larger than that of the first gap.

* * * * *